(12) United States Patent
Liu et al.

(10) Patent No.: US 12,666,239 B2
(45) Date of Patent: Jun. 23, 2026

(54) VEHICLE AND EMERGENCY CALL METHOD, APPARATUS AND SYSTEM THEREOF

(71) Applicant: Yinwang Intelligent Technologies Co., Ltd., Shenzhen (CN)

(72) Inventors: Wenliang Liu, Shanghai (CN); Xianggeng Zhu, Shanghai (CN); Jun Sun, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 299 days.

(21) Appl. No.: 18/210,815

(22) Filed: Jun. 16, 2023

(65) Prior Publication Data

US 2023/0336959 A1 Oct. 19, 2023

Related U.S. Application Data

(63) Continuation of application No. PCT/CN2020/137675, filed on Dec. 18, 2020.

(51) Int. Cl.
*H04W 4/90* (2018.01)
*B60W 50/02* (2012.01)
*H04W 4/40* (2018.01)

(52) U.S. Cl.
CPC .......... *H04W 4/90* (2018.02); *B60W 50/0205* (2013.01); *H04W 4/40* (2018.02); *B60W 2556/45* (2020.02)

(58) Field of Classification Search
CPC .......... H04W 4/90; H04W 4/40; G08G 1/162; G08G 1/166

USPC ....................................................... 455/404.1
See application file for complete search history.

(56) References Cited

U.S. PATENT DOCUMENTS

| | | | | |
|---|---|---|---|---|
| 7,580,697 B2 * | 8/2009 | Lappe | .................. | G08B 25/016 |
| | | | | 340/425.5 |
| 8,818,597 B2 * | 8/2014 | Yamane | ................ | B60W 50/02 |
| | | | | 307/10.6 |
| 8,937,931 B2 * | 1/2015 | Kuz | ..................... | H04M 3/5116 |
| | | | | 455/404.1 |

(Continued)

FOREIGN PATENT DOCUMENTS

| | | |
|---|---|---|
| CN | 103342118 A | 10/2013 |
| EP | 3882878 A1 | 9/2021 |
| WO | 2018157531 A1 | 9/2018 |

*Primary Examiner* — Maria El-Zoobi
(74) *Attorney, Agent, or Firm* — WOMBLE BOND DICKINSON (US) LLP

(57) ABSTRACT

This application discloses a vehicle and an emergency call method, apparatus, and system thereof, and relates to the field of vehicle technologies. When determining that a vehicle has an emergency rescue requirement, an in-vehicle communication component in the system may send an assistance call request to a mobile terminal through wireless communication, and the mobile terminal may further send an emergency call request to a rescue platform based on the assistance call request. Therefore, even if a mobile communication function of the in-vehicle communication component is damaged or a hard line between the in-vehicle communication component and another component is disconnected, the in-vehicle communication component can indicate the mobile terminal to assist in sending the emergency call request. This effectively improves reliability of the emergency call system.

18 Claims, 9 Drawing Sheets

(56)     References Cited

U.S. PATENT DOCUMENTS

|  |  |  |  |  |
|---|---|---|---|---|
| 9,288,270 | B1 * | 3/2016 | Penilla .................. | H04L 67/141 |
| 9,432,828 | B1 * | 8/2016 | Tu ...................... | H04M 1/72421 |
| 9,672,719 | B1 * | 6/2017 | Hollenstain ............ | G08B 21/18 |
| 10,037,683 | B1 | 7/2018 | Hosey et al. | |
| 2010/0167737 | A1 * | 7/2010 | Madhavan ............ | H04W 48/20 |
| | | | | 455/435.2 |
| 2012/0046009 | A1 * | 2/2012 | Persson ........... | H04M 1/724094 |
| | | | | 455/404.1 |
| 2014/0206308 | A1 * | 7/2014 | Hatton ................... | H04W 4/90 |
| | | | | 455/404.1 |
| 2015/0365979 | A1 * | 12/2015 | Park ....................... | H04W 4/02 |
| | | | | 455/404.2 |
| 2016/0258766 | A1 * | 9/2016 | Felemban ............. | H04W 48/18 |
| 2019/0033875 | A1 * | 1/2019 | Perez Barrera ... | B60W 30/0956 |
| 2021/0279973 | A1 * | 9/2021 | Nagata ............. | H04W 36/0055 |

* cited by examiner

CONT.
FROM

FROM

FROM

107: send the
emergency call
request to the rescue
platform based on the
received assistance
call request 108: Send rescue
information based on
the received assistance
call request 109: Send the rescue
information 111: Send the obtained rescue
information to the rescue platform 110: Send the
obtained rescue
information to the
rescue platform

VEHICLE AND EMERGENCY CALL METHOD, APPARATUS AND SYSTEM THEREOF

CROSS-REFERENCE TO RELATED APPLICATIONS

This application is a continuation of International Application No. PCT/CN2020/137675, filed on Dec. 18, 2020, the disclosure of which is hereby incorporated by reference in its entirety.

TECHNICAL FIELD

This application relates to the field of vehicle technologies, and in particular, to a vehicle and an emergency call method, apparatus, and system thereof.

BACKGROUND

An emergency call (ECALL) system configured in a vehicle generally includes a telematics box (TBOX), and the TBOX is further connected to an airbag controller of the vehicle. The TBOX can automatically make a rescue call to an emergency rescue center after detecting a collision signal sent by the airbag controller.

However, if a mobile communication function of the TBOX is damaged due to a vehicle collision, the TBOX cannot normally make the rescue call. As a result, reliability of the emergency call system is poor.

SUMMARY

This application provides a vehicle and an emergency call method, apparatus, and system thereof, to resolve a technical problem of poor reliability of an emergency call system of a vehicle.

In an embodiment, this application provides an emergency call system of a vehicle. The system includes an in-vehicle communication component, a mobile terminal, and a fault detection component. The fault detection component is connected to the in-vehicle communication component. The fault detection component is configured to send obtained detection information to the in-vehicle communication component. The detection information includes at least one of fault information of the vehicle and a rescue request. The in-vehicle communication component is configured to: if it is determined, based on the detection information, that the vehicle has an emergency rescue requirement, send an assistance call request to the mobile terminal through wireless communication. The mobile terminal is configured to send an emergency call request to a rescue platform based on the assistance call request.

According to the system provided in this application, even if a mobile communication function of the in-vehicle communication component is damaged, the in-vehicle communication component can indicate the mobile terminal to assist in sending the emergency call request. This effectively improves reliability of the emergency call system.

In an embodiment, the in-vehicle communication component is configured to: if it is determined, based on the detection information, that the vehicle has the emergency rescue requirement, and it is determined that the in-vehicle communication component does not meet a first call condition, send the assistance call request to the mobile terminal through wireless communication.

Correspondingly, if determining that the in-vehicle communication component meets the first call condition, the in-vehicle communication component may directly send the emergency call request to the rescue platform, without sending the assistance call request to the mobile terminal. In this way, efficiency of sending the emergency call request can be effectively improved, to ensure timely rescue, and a power consumption waste caused by sending the assistance call request to the mobile terminal can be avoided.

In an embodiment, the in-vehicle communication component is further configured to: if it is determined, based on the detection information, that the vehicle has the emergency rescue requirement, send performance information of the in-vehicle communication component to the mobile terminal through wireless communication. The mobile terminal is configured to: if it is determined, based on the performance information of the in-vehicle communication component, that the in-vehicle communication component does not meet a first call condition, send the emergency call request to the rescue platform based on the assistance call request.

When determining that the in-vehicle communication component is not capable of sending the emergency call request, the mobile terminal may send the emergency call request to the rescue platform in time, to ensure that the vehicle and a user in the vehicle can be rescued in time. In addition, if determining that the in-vehicle communication component meets the first call condition, the mobile terminal may not need to send the emergency call request. This avoids not only a waste of a battery level of the mobile terminal, but also a case that signal interference caused by simultaneous sending of emergency call requests by a plurality of components affects communication quality.

In an embodiment, the first call condition includes at least one of the following conditions. A communication status of the in-vehicle communication component meets a communication condition: the in-vehicle communication component maintains a connection to a multimedia interaction component of the vehicle: the in-vehicle communication component can obtain the fault information of the vehicle; and the in-vehicle communication component can obtain location information of the vehicle.

It should be understood that, because the emergency call request can be normally sent only when the communication status of the in-vehicle communication component meets the communication condition, the first call condition may include at least: the communication status of the in-vehicle communication component meets the communication condition.

In an embodiment, the in-vehicle communication component may be configured to: send a connection request to the mobile terminal, and after establishing a wireless connection to the mobile terminal, send the assistance call request to the mobile terminal based on the wireless connection, or broadcast the assistance call request within a target frequency band. The mobile terminal is further configured to: if the assistance call request is detected within the target frequency band, broadcast an assistance call response within the target frequency band.

The in-vehicle communication component may send the assistance call request to the mobile terminal in a plurality of different manners. This effectively improves flexibility of sending the assistance call request.

In an embodiment, the mobile terminal is further configured to send performance information of the mobile terminal to the in-vehicle communication component through wireless communication. The in-vehicle communication component is further configured to: if it is determined, based on the performance information of the mobile terminal, that the mobile terminal does not meet a second call condition, send the emergency call request to the rescue platform.

The mobile terminal may send the performance information to the in-vehicle communication component based on the assistance call request sent by the in-vehicle communication component. Alternatively, the mobile terminal obtains a request based on the performance information sent by the in-vehicle communication component, to send the performance information to the in-vehicle communication component. If determining, based on the performance information, that the mobile terminal is not capable of sending the emergency call request, the in-vehicle communication component may directly send the emergency call request to the rescue platform, to ensure timely rescue. In this scenario, if determining that the in-vehicle communication component is also not capable of sending the emergency call request (that is, the first call condition is not met), the in-vehicle communication component may still attempt to send the emergency call request, to improve a probability of successfully sending the emergency call request as much as possible.

In an embodiment, the second call condition may include: a communication status of the mobile terminal meets the communication condition, and/or a remaining battery level of the mobile terminal is greater than a battery level threshold. The communication status may be represented by signal strength. Correspondingly, the communication condition may be that the signal strength is greater than a strength threshold.

In an embodiment, the in-vehicle communication component is further configured to send rescue information to the mobile terminal through wireless communication. The mobile terminal is further configured to send the rescue information to the in-vehicle communication component through wireless communication. A target component in the mobile terminal and the in-vehicle communication component is further configured to send the obtained rescue information to the rescue platform. The target component is a component that sends the emergency call request to the rescue platform. The rescue information includes at least one of the following information: the location information of the vehicle, the fault information of the vehicle, an identifier of the rescue platform, and vehicle information of the vehicle.

In the system provided in this application, the in-vehicle communication component and the mobile terminal may further exchange the rescue information obtained by the in-vehicle communication component and the mobile terminal, to ensure that the rescue information sent by the target component to the rescue platform is complete. Further, rescue efficiency can be effectively improved.

In an embodiment, the system further includes a cockpit domain controller connected to the fault detection component. The cockpit domain controller is configured to: if it is determined, based on the detection information, that the vehicle has the emergency rescue requirement, send the assistance call request to the mobile terminal through wireless communication.

When the vehicle has the emergency rescue requirement, the in-vehicle communication component cannot send the assistance call request due to functional damage. Therefore, the cockpit domain controller is enabled to also have a function of sending the assistance call request. This ensures that when the vehicle has the emergency rescue requirement, the mobile terminal can be timely indicated to assist in sending the emergency call request, thereby effectively improving reliability of the entire system.

In an embodiment, the cockpit domain controller may be further configured to send the fault information of the vehicle to the mobile terminal through wireless communication. The mobile terminal may further send the fault information to the rescue platform, to improve rescue efficiency.

In an embodiment, an emergency call method is provided, which is applied to an in-vehicle communication component in an emergency call system. The system further includes a mobile terminal and a fault detection component. The method includes: receiving detection information sent by the fault detection component, where the detection information includes at least one of fault information of a vehicle and a rescue request; and sending an assistance call request to the mobile terminal through wireless communication if it is determined, based on the detection information, that the vehicle has an emergency rescue requirement, where the assistance call request indicates the mobile terminal to send an emergency call request to a rescue platform.

In an embodiment, if it is determined, based on the detection information, that the vehicle has the emergency rescue requirement, a process of sending the assistance call request to the mobile terminal through wireless communication may include: if it is determined, based on the detection information, that the vehicle has the emergency rescue requirement, and it is determined that the in-vehicle communication component does not meet a first call condition, sending the assistance call request to the mobile terminal through wireless communication.

In an embodiment, a process of sending the assistance call request to the mobile terminal through wireless communication may include: sending a connection request to the mobile terminal, and after establishing a wireless connection to the mobile terminal, sending the assistance call request to the mobile terminal based on the wireless connection, or broadcasting the assistance call request within a target frequency band.

In an embodiment, the method may further include: receiving, through wireless communication, performance information that is of the mobile terminal and that is sent by the mobile terminal based on the assistance call request; and sending the emergency call request to the rescue platform if it is determined, based on the performance information of the mobile terminal, that the mobile terminal does not meet a second call condition.

In an embodiment, an emergency call method is provided, and is applied to a mobile terminal in an emergency call system. The system further includes an in-vehicle communication component and a fault detection component. The method includes: receiving, through wireless communication, an assistance call request sent by the in-vehicle communication component, where the assistance call request is sent by the in-vehicle communication component after the in-vehicle communication component determines, based on detection information obtained by the fault detection component, that a vehicle has an emergency rescue requirement, and the detection information includes at least one of fault information of the vehicle and a rescue request; and sending an emergency call request to a rescue platform based on the assistance call request.

In an embodiment, a process of receiving, through wireless communication, the assistance call request sent by the in-vehicle communication component may include: receiving a connection request sent by the in-vehicle communication component, and after establishing a wireless connection to the in-vehicle communication component, receiving the assistance call request sent by the in-vehicle communication component based on the wireless connection: or receiving the assistance call request broadcast by the in-vehicle communication component within a target frequency band.

In an embodiment, the method may further include: receiving, through wireless communication, performance information that is of the in-vehicle communication component and that is sent by the in-vehicle communication component. Correspondingly, a process of sending the emergency call request to the rescue platform based on the assistance call request may include: sending the emergency call request to the rescue platform based on the assistance call request if it is determined, based on the performance information of the in-vehicle communication component, that the in-vehicle communication component does not meet a first call condition.

In an embodiment, the system further includes a cockpit domain controller that establishes the wireless connection to the mobile terminal. The method may further include: receiving the assistance call request sent by the cockpit domain controller through wireless communication.

In an embodiment, an in-vehicle communication component is provided, and is applied to an emergency call system. The system further includes a mobile terminal and a fault detection component. The in-vehicle communication component includes a programmable logic circuit and/or program instructions, and the in-vehicle communication component is configured to implement the method that is provided in the foregoing aspect and that is applied to the in-vehicle communication component.

In an embodiment, a mobile terminal is provided, and is applied to an emergency call system. The system further includes an in-vehicle communication component and a fault detection component. The mobile terminal includes a memory, a processor, and a computer program that is stored in the memory and that can run on the processor. When the processor executes the computer program, the method that is provided in the foregoing aspect and that is applied to the mobile terminal is implemented.

In an embodiment, a computer-readable storage medium is provided. The computer-readable storage medium stores instructions, and the instructions are executed by a processor to implement the method that is applied to the in-vehicle communication component and that is provided in the foregoing aspect, or implement the method that is applied to the mobile terminal and that is provided in the foregoing aspect.

In an embodiment, a vehicle is provided. The vehicle includes: a body, and the emergency call system provided in the foregoing aspect. Both the in-vehicle communication component and the fault detection component in the emergency call system are fastened to the body, and the mobile terminal in the emergency call system can move relative to the body.

The technical solutions provided in this application include at least the following beneficial effects.

Embodiments of this application provide the vehicle and the emergency call method, apparatus, and system thereof. When determining that the vehicle has the emergency rescue requirement, the in-vehicle communication component in the system may send the assistance call request to the mobile terminal through wireless communication. The mobile terminal may further send the emergency call request to the rescue platform based on the assistance call request.

Therefore, even if the mobile communication function of the in-vehicle communication component is damaged or a hard line between the in-vehicle communication component and another component is disconnected, the in-vehicle communication component can indicate the mobile terminal to assist in sending the emergency call request. This effectively improves reliability of the emergency call system.

DESCRIPTION OF EMBODIMENTS

To make objectives, technical solutions, and advantages of this application clearer, the following further describes implementations of this application in detail with reference to the accompanying drawings.

Figure 1:
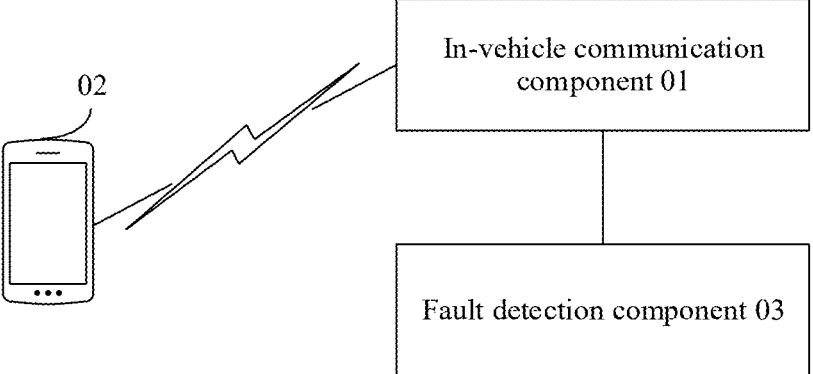
FIG. 1 is a schematic diagram of a structure of an emergency call system of a vehicle according to an embodiment of this application.

An embodiment of this application provides an emergency call system of a vehicle. The vehicle may be an intelligent vehicle or a connected vehicle, and the vehicle may be a new energy vehicle (for example, an electric vehicle) or a fuel vehicle. As shown in FIG. 1, the system includes an in-vehicle communication component 01, a mobile terminal 02, and a fault detection component 03.

The fault detection component 03 is connected to the in-vehicle communication component 01. The fault detection component 03 is configured to send obtained detection information to the in-vehicle communication component 01. The detection information includes at least one of fault information of a vehicle and a rescue request.

The in-vehicle communication component 01 is configured to: if it is determined, based on the detection information, that the vehicle has an emergency rescue requirement, send an assistance call request to the mobile terminal 02 through wireless communication. A wireless communication manner may include Bluetooth, wireless fidelity (Wi-Fi), or communication in a target frequency band. The target frequency band may be a rescue frequency band.

The mobile terminal 02 is configured to send an emergency call request to a rescue platform based on the assistance call request.

In an embodiment of the application, both the in-vehicle communication component 01 and the fault detection component 03 are fastened in the vehicle, but the mobile terminal 02 is not fastened in the vehicle, that is, the mobile terminal 02 can move relative to a body of the vehicle. For example, the mobile terminal 02 may be a movable device that has a communication function, such as a mobile phone, a phone watch, a notebook computer, a tablet computer, or a wearable device. The in-vehicle communication component 01 may be a module with a mobile communication function. For example, the in-vehicle communication component 01 may be a TBOX, and at least one subscriber identification module (SIM) card is installed in the TBOX. The TBOX may send the emergency call request to the rescue platform by using the SIM card.

In conclusion, an embodiment of the application provides the emergency call system of the vehicle. When determining that the vehicle has the emergency rescue requirement, the in-vehicle communication component in the system may send the assistance call request to the mobile terminal through wireless communication. The mobile terminal may further send the emergency call request to the rescue platform based on the assistance call request. Therefore, even if the mobile communication function of the in-vehicle communication component is damaged, the in-vehicle communication component can indicate the mobile terminal to assist in sending the emergency call request. This effectively improves reliability of the emergency call system.

Figure 2:
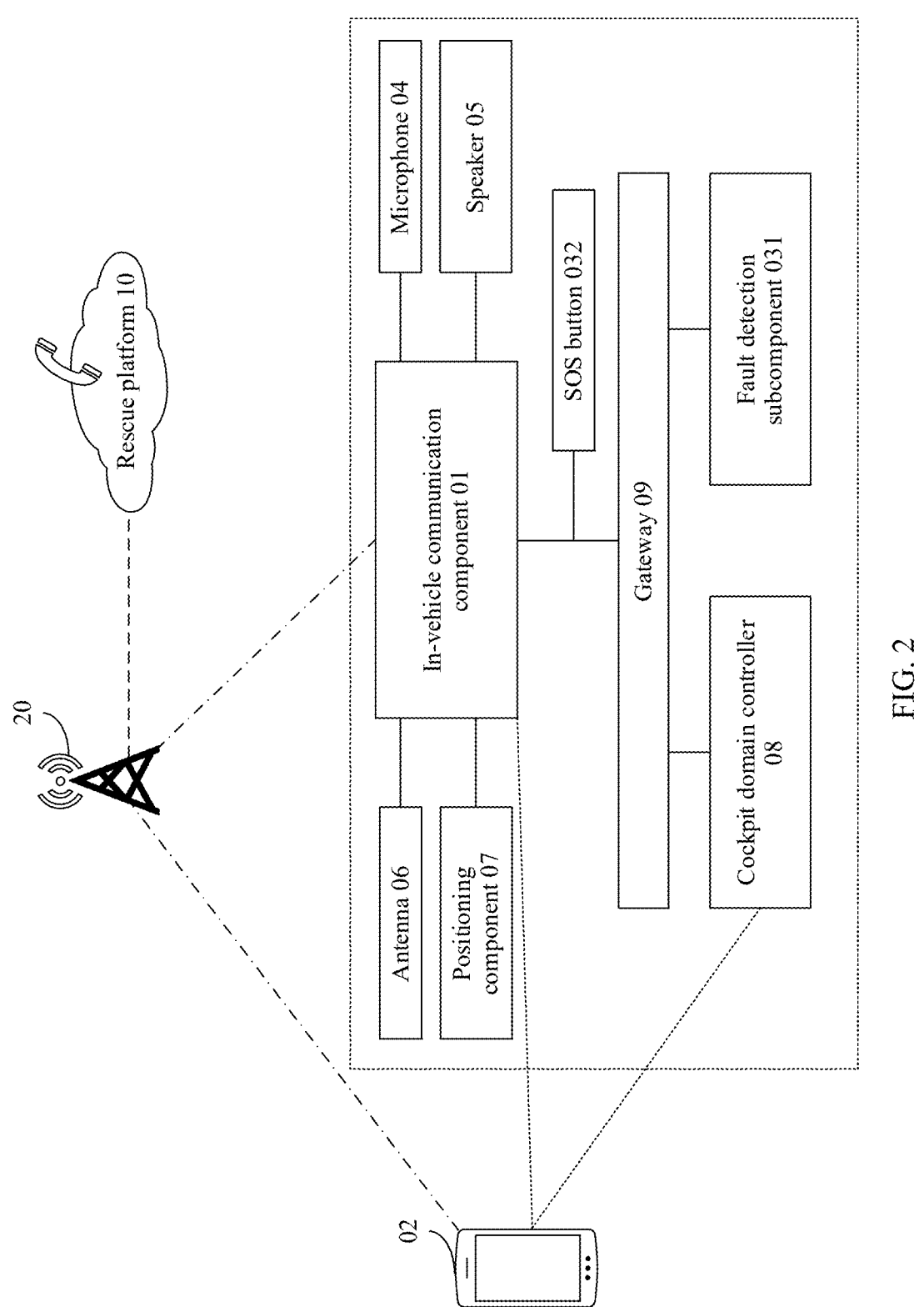
FIG. 2 is a schematic diagram of a structure of another emergency call system of a vehicle according to an embodiment of this application.

FIG. 2 is a schematic diagram of a structure of another emergency call system according to an embodiment of this application. As shown in FIG. 2, the emergency call system may further include a microphone 04, a speaker 05, an antenna 06, and a positioning component 07. The positioning component 07 may be a global positioning system (GPS) module. The in-vehicle communication component 01 may be separately connected to the microphone 04, the speaker 05, the antenna 06, and the positioning component 07 through a connection cable (also referred to as a hard wire). After determining that a vehicle has an emergency rescue requirement, the in-vehicle communication component 01 may send an emergency call request to a rescue platform 10 through the antenna 06. In addition, after receiving an emergency call response sent by the rescue platform 10, the in-vehicle communication component 01 may further send, to the rescue platform 10, location information of the vehicle collected by the positioning component 07. A voice call between a user (for example, a user in a vehicle) and the rescue platform 10 is implemented by using the microphone 04 and the speaker 05.

When the vehicle has the emergency rescue requirement, but the connection cable between the in-vehicle communication component 01 and at least one of the microphone 04, the speaker 05, the antenna 06, and the positioning component 07 is disconnected, the in-vehicle communication component 01 cannot normally exchange information with the rescue platform 10. However, in the system provided in an embodiment of the application, the mobile terminal 02 may be a terminal with a positioning function and a voice call function. This ensures that after the connection cable between the in-vehicle communication component 01 and another component is disconnected, the mobile terminal 02 can further normally exchange information with the rescue platform 10, thereby effectively improving rescue efficiency.

In an embodiment, as shown in FIG. 2, both the in-vehicle communication component 01 and the mobile terminal 02 may send the emergency call request to the rescue platform 10 through a base station 20. Both the in-vehicle communication component 01 and the mobile terminal 02 may establish a communication connection to the base station 20 by using an air interface network, and the base station 20 may establish a communication connection to the rescue platform 10 by using a public network. For example, both the in-vehicle communication component 01 and the mobile terminal 02 may send the emergency call request to the rescue platform 10 by using a second generation mobile communication network (2-generation mobile network, 2G), 3G, 4G, or 5G.

The rescue platform 10 may also be referred to as a rescue center. Sending the emergency call request to the rescue platform 10 may also be understood as dialing an emergency rescue call to the rescue center.

Refer to FIG. 2. In an embodiment of the application, the fault detection component 03 may include at least one of a fault detection subcomponent 031 and an emergency rescue button (which may also be referred to as an SOS button) 032. The fault detection subcomponent 031 is configured to collect fault information of the vehicle, and the emergency rescue button 032 is configured to trigger generation of a rescue request when a pressing operation is detected.

In an embodiment, the emergency rescue button 032 may be a physical button in the vehicle, or may be a virtual button displayed on a human-computer interaction interface in the vehicle. The fault detection subcomponent 031 may include at least one of the following components: an airbag controller, a temperature sensor, a smoke sensor, a speed sensor, an accelerometer, a gravity sensor, and the like. Correspondingly, the fault information may include at least one of the following information: information indicating that an airbag is ejected, a temperature in the vehicle, smoke concentration in the vehicle, a speed of the vehicle, an acceleration of the vehicle, a posture of the vehicle, and the like.

The in-vehicle communication component 01 may determine, when detecting that the detection information includes the rescue request, that the vehicle has the emergency rescue requirement. The in-vehicle communication component 01 may further determine, when detecting that the detection information meets at least one of the following conditions, that the vehicle has the emergency rescue requirement.

The conditions are that the detection information includes the information indicating that an airbag is ejected, the temperature in the vehicle is beyond a target temperature range, the smoke concentration in the vehicle is greater than a concentration threshold, the speed of the vehicle is greater than a speed threshold, the acceleration of the vehicle is greater than a speed threshold, and the posture of the vehicle is an abnormal posture (for example, the vehicle is in a rollover state).

The information indicating that an airbag is ejected may include a quantity and locations of ejected airbags. The target temperature range, the concentration threshold, the speed threshold, the speed threshold, and the abnormal posture may all be prestored in the in-vehicle communication component 01.

In an embodiment of the application, the in-vehicle communication component 01 may send the assistance call request to the mobile terminal 02 in a plurality of different manners.

In an embodiment, the in-vehicle communication component 01 may be configured to: send a connection request to the mobile terminal 02, and after establishing a wireless connection to the mobile terminal 02, send the assistance call request to the mobile terminal 02 based on the wireless connection.

For example, the in-vehicle communication component 01 may establish the wireless connection to the mobile terminal 02 through Bluetooth, Wi-Fi, near field communication (NFC), or the like.

In an embodiment, after establishing a wireless connection to the mobile terminal 02, the in-vehicle communication component 01 may further first obtain performance information of the mobile terminal 02, and detect, based on the performance information, whether the mobile terminal 02 meets a second call condition. If determining that the mobile terminal 02 meets the second call condition, the in-vehicle communication component 01 may send the assistance call request to the mobile terminal 02. If determining that the mobile terminal 02 does not meet the second call condition, the in-vehicle communication component 01 may search for another mobile terminal, and send a connection request to the another mobile terminal. Alternatively, if detecting no mobile terminal that meets the second call condition, the in-vehicle communication component 01 may directly send the emergency call request to the rescue platform 10.

The performance information of the mobile terminal 02 may include a communication status of the mobile terminal 02, and/or a remaining battery level of the mobile terminal 02. If the performance information includes the communication status of the mobile terminal 02, the second call condition may include: the communication status of the mobile terminal 02 meets a communication condition. If the performance information includes the remaining battery level of the mobile terminal 02, the second call condition may include: the remaining battery level of the mobile terminal 02 is greater than a battery level threshold.

In an embodiment, the in-vehicle communication component 01 may be configured to broadcast the assistance call request within a target frequency band. In other words, the in-vehicle communication component 01 may send the assistance call request to the mobile terminal 02 in a broadcast manner. The target frequency band may be a rescue frequency band.

Correspondingly, if the mobile terminal 02 detects the assistance call request within the target frequency band, the mobile terminal 02 may further broadcast an assistance call response within the target frequency band. The in-vehicle communication component 01 may further determine, based on the assistance call response, that the mobile terminal 02 has received the assistance call request.

In an embodiment, after detecting the assistance call response within the target frequency band, the in-vehicle communication component 01 may further establish a wireless connection to the mobile terminal 02 that broadcasts the assistance call response. For example, the wireless connection may be established through Bluetooth, Wi-Fi, NFC, or the like.

It can be learned based on the foregoing description that the in-vehicle communication component 01 may send the assistance call request to the mobile terminal 02 in a plurality of different manners. This effectively improves flexibility of sending the assistance call request.

In a first optional implementation, the in-vehicle communication component 01 may be configured to: if it is determined, based on the detection information, that the vehicle has the emergency rescue requirement, and it is determined that the in-vehicle communication component 01 does not meet a first call condition, send the assistance call request to the mobile terminal 02 through wireless communication.

Correspondingly, if determining that the in-vehicle communication component 01 meets the first call condition, the in-vehicle communication component 01 may directly send the emergency call request to the rescue platform 10, without sending the assistance call request to the mobile terminal 02. In this way, efficiency of sending the emergency call request can be effectively improved, to ensure timely rescue, and a power consumption waste caused by sending the assistance call request to the mobile terminal 02 can be avoided.

For example, in an embodiment of the application, the first call condition may include at least one of the following conditions:

a communication status of the in-vehicle communication component 01 meets the communication condition;

the in-vehicle communication component 01 maintains a connection to a multimedia interaction component of the vehicle;

the in-vehicle communication component 01 can obtain the fault information of the vehicle; and the in-vehicle communication component 01 can obtain the location information of the vehicle.

That the communication status meets the communication condition may mean that a mobile communication function of the in-vehicle communication component 01 is normal, and signal strength of the in-vehicle communication component 01 is greater than a strength threshold. The multimedia interaction component may include at least an audio interaction component. For example, refer to FIG. 2. The audio interaction component may include the microphone 04 and the speaker 05. Certainly, the multimedia interaction component may further include an image interaction component. For example, the image interaction component may include a display and a camera.

When the vehicle has the emergency rescue requirement, if the mobile communication function of the in-vehicle communication component 01 is damaged, or the vehicle is in an area with a weak mobile communication signal, the in-vehicle communication component 01 cannot normally send the emergency call request. Therefore, if the emergency call request needs to be sent by the in-vehicle communication component 01, it needs to be ensured that at least the communication status of the in-vehicle communication component 01 meets the communication condition.

In addition, the in-vehicle communication component 01 is connected to the fault detection component 03, the multimedia interaction component, the antenna 06, and the positioning component 07 through hard wires. Therefore, when the vehicle has the emergency rescue requirement, the hard wires between the in-vehicle communication component 01 and the foregoing components may be broken or poorly connected. As a result, the in-vehicle communication component 01 cannot normally exchange information with the rescue platform 10. For example, when the connection cable between the in-vehicle communication component 01 and the positioning component 07 is broken, the in-vehicle communication component 01 cannot obtain and report location information of the vehicle. When the connection cable between the in-vehicle communication component 01 and the multimedia interaction component is broken, the in-vehicle communication component 01 cannot implement a call between a user in the vehicle and the rescue platform. Correspondingly, in an embodiment of the application, to ensure rescue efficiency, it further needs to be ensured that the in-vehicle communication component 01 remains a connection to the foregoing components.

In the foregoing first optional implementation, the mobile terminal 02 may establish a wireless connection to the in-vehicle communication component 01 in a passive connection manner. In other words, after determining, based on the detection information, that the vehicle has the emergency rescue requirement and determining that the in-vehicle communication component 01 does not meet the first call condition, the in-vehicle communication component 01 may establish a wireless connection to the mobile terminal 02, and send the assistance call request.

In a second optional implementation, the in-vehicle communication component 01 may be further configured to: if it is determined, based on the detection information, that the vehicle has the emergency rescue requirement, send performance information of the in-vehicle communication component 01 to the mobile terminal 02 through wireless communication.

The mobile terminal 02 may be configured to: if it is determined, based on the performance information of the in-vehicle communication component 01, that the in-vehicle communication component 01 does not meet the first call condition, send the emergency call request to the rescue platform based on the assistance call request.

In other words, after receiving the assistance call request, the mobile terminal 02 may first detect, based on the performance information of the in-vehicle communication component 01, whether the in-vehicle communication component 01 meets the first call condition. If determining that the in-vehicle communication component 01 does not meet the first call condition, the mobile terminal 02 may send the emergency call request to the rescue platform, to ensure that the vehicle and the user in the vehicle can be rescued in time.

In addition, if determining that the in-vehicle communication component 01 meets the first call condition, the mobile terminal 02 may not need to send the emergency call request. This avoids not only a waste of a battery level of the mobile terminal 02, but also a case that signal interference caused by simultaneous sending of emergency call requests by a plurality of components affects communication quality.

The performance information of the in-vehicle communication component 01 may include a performance parameter related to the first call condition. For example, refer to FIG. 3. The performance information of the in-vehicle communication component 01 may include at least a communication status, and may further include at least one of the following information: a connection status to the multimedia interaction component, a connection status to the fault detection component 03, and a connection status to the positioning component 07.

In the second optional implementation, before determining that the vehicle has a rescue requirement, the in-vehicle communication component 01 may already establish a wireless connection to the mobile terminal 02. For example, in this implementation, the mobile terminal 02 may actively establish a wireless connection to the in-vehicle communication component 01 through Bluetooth, Wi-Fi, NFC, or the like.

Figure 3:
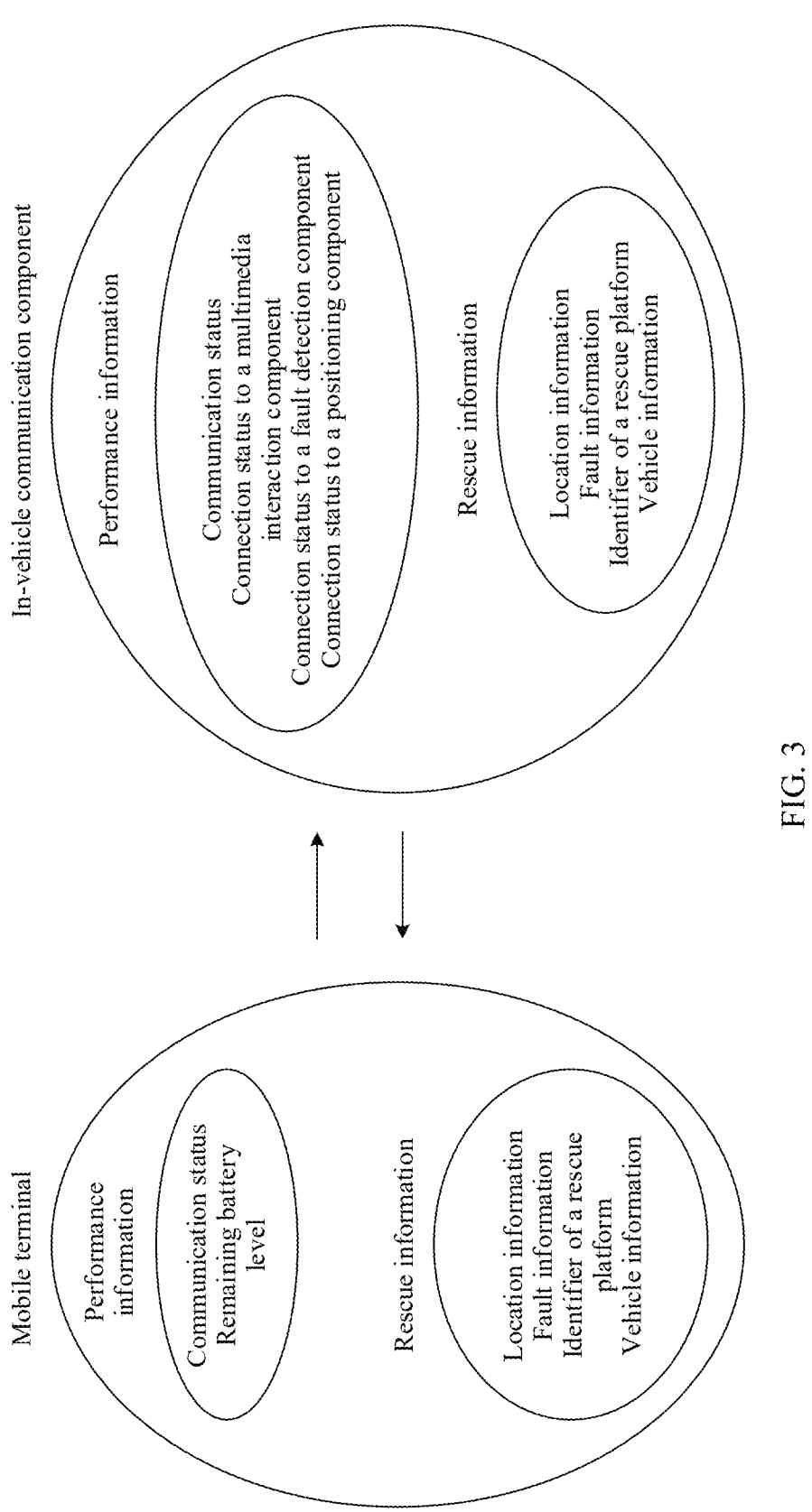
FIG. 3 is a schematic diagram of information exchanged between an in-vehicle communication component and a mobile terminal according to an embodiment of this application.

In the second optional implementation, the mobile terminal 02 may be further configured to send performance information of the mobile terminal 02 to the in-vehicle communication component 01 through wireless communication based on the assistance call request. As shown in FIG. 3, the performance information of the mobile terminal 02 may include a communication status of the mobile terminal 02 and/or a remaining battery level of the mobile terminal 02.

The in-vehicle communication component 01 is further configured to: if it is determined, based on the performance information of the mobile terminal 02, that the mobile terminal 02 does not meet the second call condition, send the emergency call request to the rescue platform 10. When determining that the mobile terminal 02 cannot normally send the emergency call request, the in-vehicle communication component 01 may directly send the emergency call request to the rescue platform 10, to ensure that the emergency call request can be sent successfully.

It can be learned from the foregoing description that, after receiving the assistance call request, the mobile terminal 02 may exchange performance information with the in-vehicle communication component 01. In addition, if the mobile terminal 02 determines that the in-vehicle communication component 01 does not meet the first call condition, and the in-vehicle communication component 01 determines that the mobile terminal 02 does not meet the second call condition, both the in-vehicle communication component 01 and the mobile terminal 02 send the emergency call request to the rescue platform 10. This can increase a probability of successfully sending the emergency call request as much as possible.

In an embodiment, for a scenario in which the in-vehicle communication component 01 meets the first call condition and the mobile terminal 02 meets the second call condition, the in-vehicle communication component 01 may send the emergency call request, and the mobile terminal 02 does not need to send the emergency call request. Alternatively, both the in-vehicle communication component 01 and the mobile terminal 02 may send the emergency call request. Alternatively, the emergency call request may be sent by a component with better communication quality in the in-vehicle communication component 01 and the mobile terminal 02. The communication quality may be determined based on a communication status, and the communication status may be represented by signal strength. Correspondingly, better communication quality may mean stronger signal strength.

In an embodiment, as shown in FIG. 3, the in-vehicle communication component 01 may be further configured to send rescue information to the mobile terminal 02 through wireless communication. The mobile terminal 02 may be further configured to send the rescue information to the in-vehicle communication component 01 through wireless communication.

A target component in the mobile terminal 02 and the in-vehicle communication component 01 may be further configured to send the obtained rescue information to the rescue platform 10.

The target component is a component that sends the emergency call request to the rescue platform 10. The rescue information obtained by the target component may include rescue information stored or collected by the target component, and rescue information sent by another component through wireless communication. For example, refer to FIG. 3. The rescue information may include at least one of the following information: location information of the vehicle, fault information of the vehicle, an identifier of the rescue platform 10, and vehicle information of the vehicle.

The identifier of the rescue platform 10 may include a telephone number of the rescue platform 10, or may further include a network address of the rescue platform 10, for example, an Internet Protocol (IP) address. The in-vehicle communication component 01 may use a Voice over Internet Protocol (VOIP) technology to communicate with the rescue platform 10. The vehicle information of the vehicle may include at least one of the following information: a vehicle identification number (VIN), fuel consumption, mileage, a vehicle model, a vehicle color, a license plate number, and the like.

It may be understood that the in-vehicle communication component 01 and/or the mobile terminal 02 may prestore the identifier of the rescue platform 10 and the vehicle information of the vehicle. The in-vehicle communication component 01 may obtain the location information of the vehicle by using the positioning component 07, and may obtain the fault information of the vehicle by using the fault detection subcomponent 031. The mobile terminal 02 may obtain the location information of the vehicle by using a positioning module configured by the mobile terminal 02.

It may be further understood that, in addition to the foregoing information, the rescue information may further include user information (for example, vehicle owner information) prestored in the in-vehicle communication component 01 and/or the mobile terminal 02. For example, the user information may include a name, a gender, an age, a height, a weight, a blood type, and the like. Alternatively, the rescue platform 10 may further establish a communication connection with a back-end server of the vehicle, and the rescue platform 10 may obtain the user information of the vehicle from the back-end server based on the vehicle information reported by the in-vehicle communication component 01 and/or the mobile terminal 02.

In the system provided in an embodiment of the application, because the in-vehicle communication component 01 and the mobile terminal 02 may exchange the rescue information obtained by the in-vehicle communication component 01 and the mobile terminal 02, it can be ensured that the rescue information sent by the target component to the rescue platform 10 is complete. Further, rescue efficiency can be effectively improved.

It may be further understood that, if the target component is the in-vehicle communication component 01, after successfully sending the emergency call request, the in-vehicle communication component 01 may further exchange multimedia data with the rescue platform 10 by using the multimedia interaction component connected to the in-vehicle communication component 01. The multimedia data indication includes audio data, or may further include image data.

If the target component is the mobile terminal 02, after successfully sending the emergency call request, the mobile terminal 02 may automatically enable a multimedia interaction module of the mobile terminal 02, and exchange multimedia data with the rescue platform 10 by using the multimedia interaction module. The multimedia interaction module may include at least a microphone and a speaker, or may further include a display and a camera.

In an embodiment, still refer to FIG. 2. The system may further include a cockpit domain controller 08 connected to the fault detection component 03. For example, the cockpit domain controller 08 may be connected to a gateway (GW) through a controller area network (CAN) bus, and the GW is connected to the fault detection component 03 through the CAN bus. In addition, the cockpit domain controller 08 further establishes a wireless connection to the mobile terminal 02. For example, the cockpit domain controller 08 may establish a wireless connection to the mobile terminal 02 through Bluetooth, Wi-Fi, NFC, or the like.

The cockpit domain controller 08 is configured to: if it is determined, based on the detection information, that the vehicle has the emergency rescue requirement, send the assistance call request to the mobile terminal 02 through wireless communication.

When the vehicle has the emergency rescue requirement, the in-vehicle communication component 01 cannot send the assistance call request due to functional damage, or the in-vehicle communication component 01 cannot detect that the vehicle has the emergency rescue requirement because a connection cable between the in-vehicle communication component 01 and the fault detection component 03 is disconnected. Therefore, in an embodiment of the application, the cockpit domain controller 08 is also enabled to have a function of sending the assistance call request. This can ensure that when the vehicle has the emergency rescue requirement, the mobile terminal can be timely indicated to assist in sending the emergency call request, thereby effectively improving reliability of the entire system.

In an embodiment, the cockpit domain controller 08 may further send obtained fault information of the vehicle to the mobile terminal 02. The mobile terminal 02 may send the fault information to the rescue platform 10, to improve rescue efficiency. Alternatively, the mobile terminal 02 may share the fault information with the in-vehicle communication component 01. Therefore, even if the connection cable between the in-vehicle communication component 01 and the fault detection component 03 is broken, the in-vehicle communication component 01 can provide complete rescue information to the rescue platform 10. This effectively improves rescue efficiency.

In conclusion, an embodiment of the application provides the emergency call system of the vehicle. When determining that the vehicle has the emergency rescue requirement, the in-vehicle communication component in the system may send the assistance call request to the mobile terminal through wireless communication. The mobile terminal may further send the emergency call request to the rescue platform based on the assistance call request. Therefore, even if a mobile communication function of the in-vehicle communication component is damaged or a hard line between the in-vehicle communication component and another component is disconnected, the in-vehicle communication component can indicate the mobile terminal to assist in sending the emergency call request. This effectively improves reliability and robustness of the emergency call system.

In addition, because a connection between the mobile terminal and the in-vehicle communication component is a wireless connection, an emergency call system fault caused by a hard wire disconnection due to a vehicle collision can be avoided. In other words, the system provided in an embodiment of the application enhances connection reliability, and may reduce a probability that an emergency call request cannot be triggered because an internal component of a vehicle is damaged due to a vehicle collision, thereby improving reliability of the entire system.

Figure 4A:
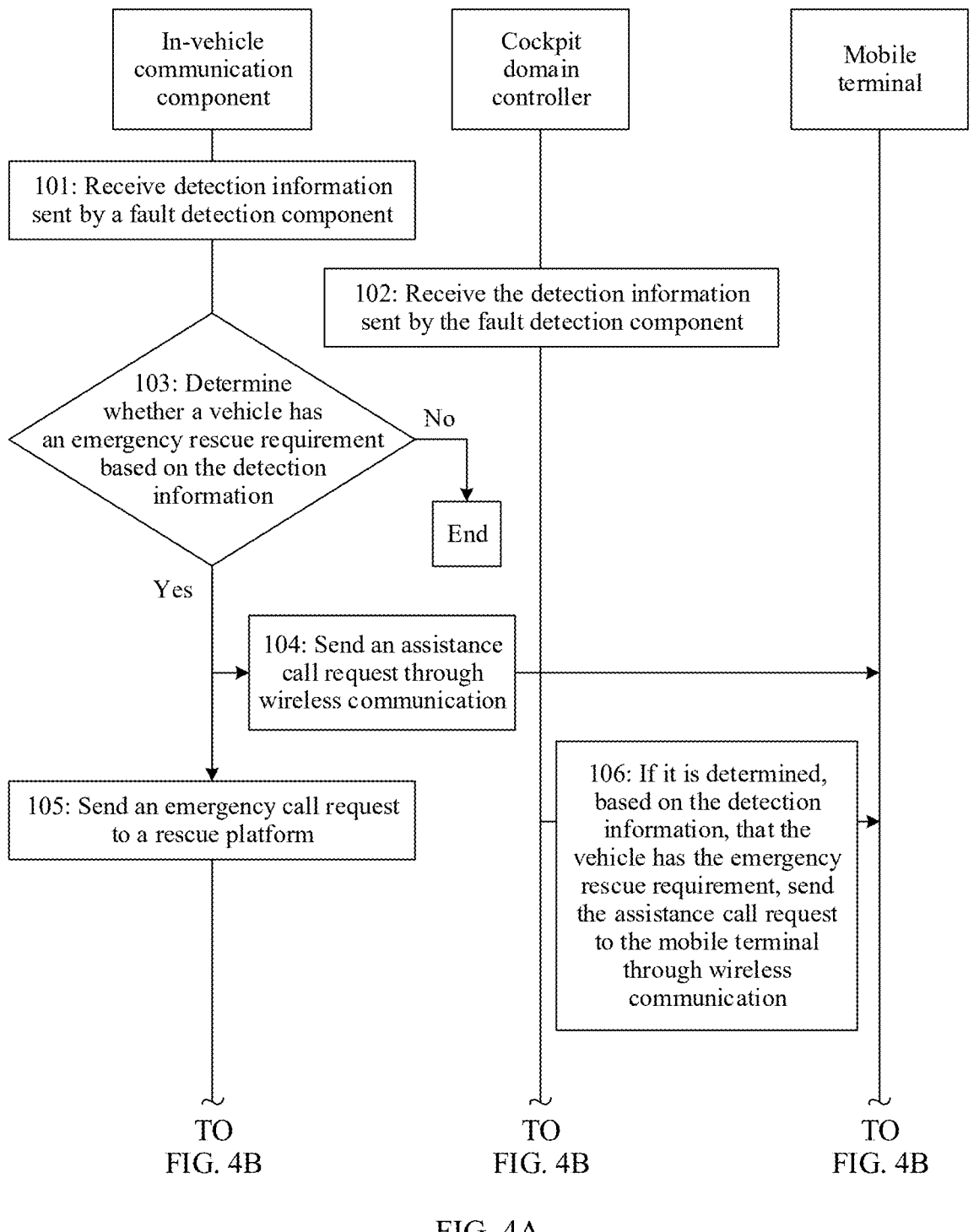
FIG. 4A and FIG. 4B are a flowchart of an emergency call method according to an embodiment of this application.
Figures 4A, 4B:
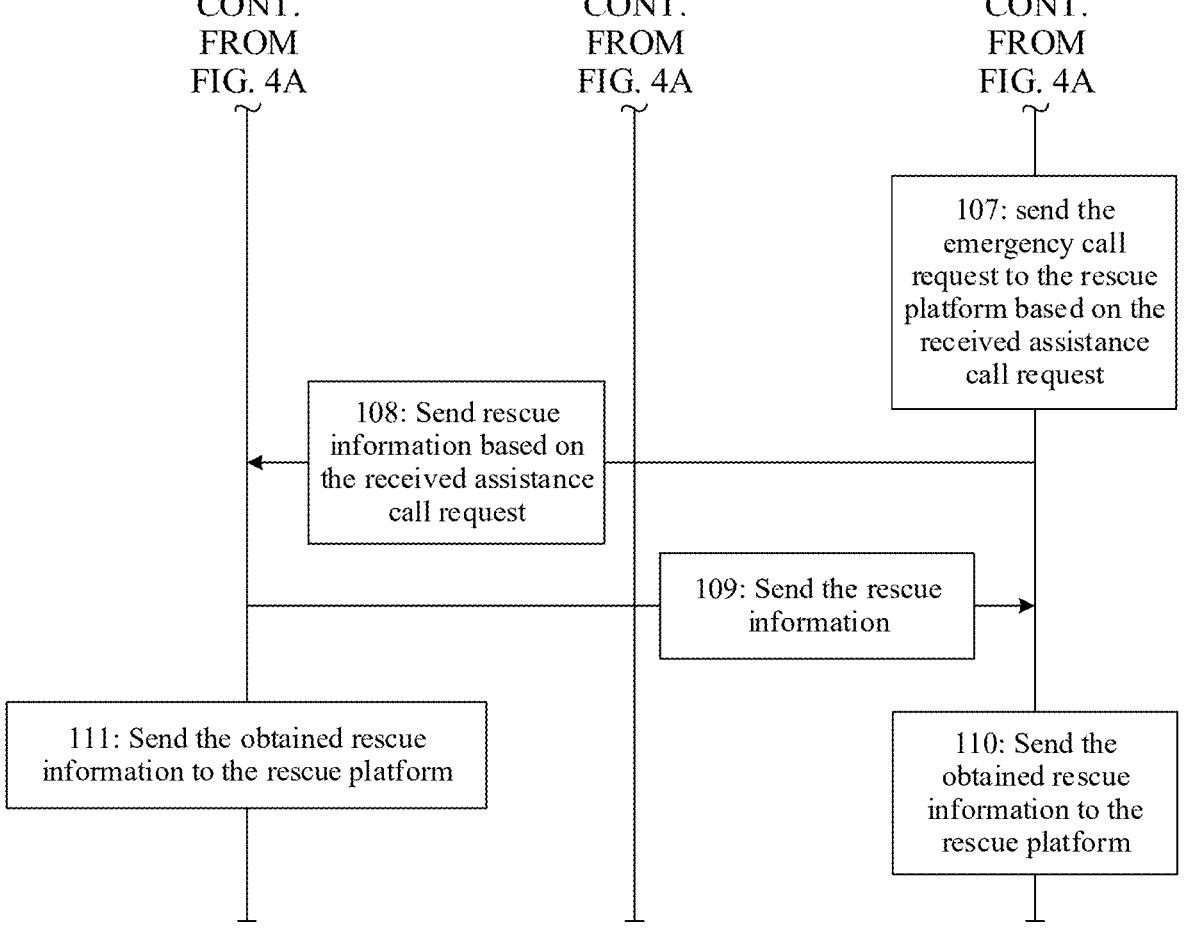

An embodiment of this application further provides an emergency call method. The method may be applied to the in-vehicle communication component 01 and the mobile terminal 02 in the emergency call system provided in the foregoing embodiment. Refer to FIG. 1 and FIG. 2. The system further includes the fault detection component 03 connected to the in-vehicle communication component 01. As shown in FIG. 4A and FIG. 4B, the method provided in an embodiment of the application includes the following operations.

Operation 101: An in-vehicle communication component receives detection information sent by a fault detection component.

The detection information may include at least one of fault information of a vehicle and a rescue request. The fault detection component may include a fault detection subcomponent and an emergency rescue button. The fault detection subcomponent may be configured to collect the fault information of the vehicle, and the emergency rescue button may trigger generation of the rescue request when a pressing operation is detected.

Operation 102: A cockpit domain controller receives the detection information sent by the fault detection component.

As shown in FIG. 2, the cockpit domain controller may obtain, by using a gateway, the detection information sent by the fault detection component.

Operation 103: The in-vehicle communication component determines, based on the detection information, whether the vehicle has an emergency rescue requirement.

If the in-vehicle communication component determines that the vehicle has the emergency rescue requirement, the following operation 104 may be performed. If the in-vehicle communication component determines that the vehicle does not have the emergency rescue requirement, an operation may be ended. In an embodiment, when determining that the vehicle has the emergency rescue requirement, the in-vehicle communication component may perform operation 105 in addition to operation 104.

Operation 104: Send an assistance call request to the mobile terminal through wireless communication.

If determining that the vehicle has the emergency rescue requirement, the in-vehicle communication component may send the assistance call request to the mobile terminal through wireless communication, to indicate the mobile terminal to assist in sending an emergency call request. Then, the in-vehicle communication component may continue to perform the following operation 109.

Operation 105: Send the emergency call request to a rescue platform.

In an embodiment of the application, if determining that the vehicle has the emergency rescue requirement, the in-vehicle communication component may directly send the emergency call request to the rescue platform.

Operation 106: If determining, based on the detection information, that the vehicle has the emergency rescue requirement, the cockpit domain controller sends the assistance call request to the mobile terminal through wireless communication.

After receiving the detection information sent by the fault detection component, the cockpit domain controller may first determine, based on the detection information, whether the vehicle has the emergency rescue requirement. If it is determined that the vehicle has the emergency rescue requirement, the assistance call request may be sent to the mobile terminal. This can ensure that when the in-vehicle communication component cannot send the assistance call request or cannot detect that the vehicle has the emergency rescue requirement, the cockpit domain controller can also timely indicate the mobile terminal to assist in sending the emergency call request.

Operation 107: The mobile terminal sends the emergency call request to the rescue platform based on the received assistance call request.

After receiving the assistance call request sent by the in-vehicle communication component and/or the cockpit domain controller, the mobile terminal may send the emergency call request to the rescue platform in response to the assistance call request.

Operation 108: The mobile terminal sends rescue information to the in-vehicle communication component based on the received assistance call request.

In an embodiment of the application, the mobile terminal may further send the rescue information to the in-vehicle communication component in response to the assistance call request. The rescue information may include location information of the vehicle, vehicle information, user information, and the like.

Operation 109: The in-vehicle communication component sends the rescue information to the mobile terminal.

The in-vehicle communication component may also share the rescue information with the mobile terminal. The rescue information may include location information of the vehicle, fault information, vehicle information, and the like.

In an embodiment of the application, because the rescue information may be shared between the mobile terminal and the in-vehicle communication component, it can be ensured that a target component configured to communicate with the rescue platform can obtain and send sufficient and complete rescue information, thereby effectively improving rescue efficiency.

Operation 110: The mobile terminal sends obtained rescue information to the rescue platform.

After operation 108, if the mobile terminal successfully sends the emergency call request, for example, a rescue phone is dialed, the mobile terminal may send the obtained rescue information to the rescue platform. The rescue information obtained by the mobile terminal may include rescue information collected by the mobile terminal (for example, location information of the vehicle, vehicle information, and user information), rescue information sent by the cockpit domain controller (for example, fault information of the vehicle), and rescue information shared by the in-vehicle communication component.

Operation 111: The in-vehicle communication component sends obtained rescue information to the rescue platform.

After operation 105, if the in-vehicle communication component successfully sends the emergency call request, the in-vehicle communication component may send the obtained rescue information to the rescue platform. The rescue information obtained by the in-vehicle communication component may include rescue information collected by the in-vehicle communication component and rescue information shared by the in-vehicle communication component.

It may be understood that a sequence of operations of the emergency call method provided in an embodiment shown in FIG. 4A and FIG. 4B may be properly adjusted, and the operations may also be correspondingly added or deleted according to a situation. For example, operation 102 and operation 106 may be deleted according to a situation, that is, only the in-vehicle communication component may indicate the mobile terminal to assist in sending the emergency call request. Alternatively, operation 108 and operation 109 may be deleted according to a situation, that is, rescue information may not be shared between the mobile terminal and the in-vehicle communication component. Alternatively, the foregoing operation 111 and operation 110 may be deleted according to a situation, that is, the mobile terminal and the in-vehicle communication component may not need to report rescue information.

Figure 5:
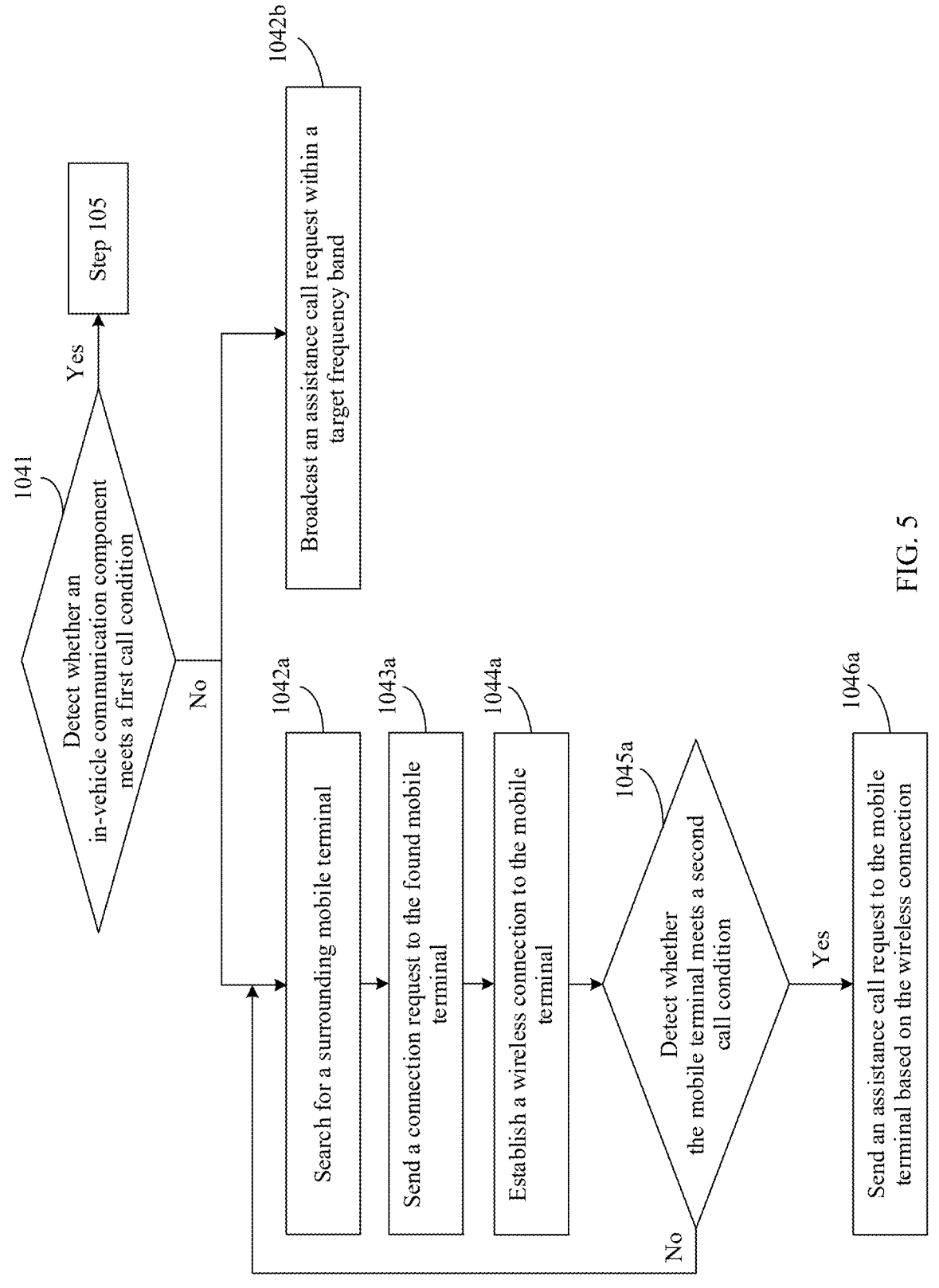
FIG. 5 is a flowchart of a method for sending an assistance call request according to an embodiment of this application.

In an embodiment, after determining that the vehicle has the emergency rescue requirement, the in-vehicle communication component may first determine whether the in-vehicle communication component is capable of sending the emergency call request. In addition, when determining that the in-vehicle communication component cannot send the emergency call request, the in-vehicle communication component may indicate the mobile terminal to assist in sending the emergency call request. Correspondingly, refer to FIG. 5. An implementation process of operation 104 may include the following operations.

Operation 1041: Detect whether the in-vehicle communication component meets a first call condition.

In an embodiment, if determining that the vehicle has the emergency rescue requirement, the in-vehicle communication component may first detect whether the in-vehicle communication component meets the first call condition. If the in-vehicle communication component determines that the in-vehicle communication component meets the first call condition, the foregoing operation 105 may be performed, that is, the emergency call request is directly sent to the rescue platform. If the in-vehicle communication component determines that the in-vehicle communication component does not meet the first call condition, the following operations 1042a to 1046a may be performed, or the following operation 1042b may be performed.

The first call condition may include at least one of the following conditions:

a communication status of the in-vehicle communication component meets a communication condition;

the in-vehicle communication component maintains a connection to a multimedia interaction component of the vehicle;

the in-vehicle communication component can obtain fault information of the vehicle: and the in-vehicle communication component can obtain location information of the vehicle.

Operation 1042a: Search for a surrounding mobile terminal.

If determining that the in-vehicle communication component does not meet the first call condition, the in-vehicle communication component may enable a wireless connection function of the in-vehicle communication component, and search for a surrounding mobile terminal that has the wireless connection function within a range. For example, the in-vehicle communication component may enable a Bluetooth connection function, and search for a surrounding mobile terminal that has the Bluetooth connection function, that is, search for a surrounding Bluetooth device.

Operation 1043a: Send a connection request to the found mobile terminal.

After finding a mobile terminal with the wireless connection function, the in-vehicle communication component may actively send the connection request to the mobile terminal. For example, the in-vehicle communication component may send a Bluetooth connection request to a found Bluetooth device.

Operation 1044a: Establish a wireless connection to the mobile terminal.

The mobile terminal may establish a wireless connection to the in-vehicle communication component in response to the connection request. For example, the Bluetooth device may send a Bluetooth connection response to the in-vehicle communication component in response to the Bluetooth connection request, and further establish a Bluetooth connection to the in-vehicle communication component.

Operation 1045a: Detect whether the mobile terminal meets a second call condition.

In an embodiment of the application, after establishing a wireless connection to the in-vehicle communication component, the mobile terminal may send performance information of the mobile terminal to the in-vehicle communication component. For example, the in-vehicle communication component may send a performance information obtaining request to the mobile terminal, and the mobile terminal may send the performance information of the mobile terminal to the in-vehicle communication component in response to the performance information obtaining request.

The in-vehicle communication component may further determine, based on the received performance information, whether the mobile terminal meets the second call condition. If determining that the mobile terminal does not meet the second call condition, the in-vehicle communication component may determine that the mobile terminal cannot assist in sending the emergency call request, and therefore the foregoing operation 1042a may continue to be performed, that is, another mobile terminal continues to be searched for.

If the in-vehicle communication component determines that the mobile terminal meets the second call condition, operation 1046a may be performed.

The performance information of the mobile terminal may include a communication status of the mobile terminal and/or a remaining battery level of the mobile terminal. If the performance information includes the communication status of the mobile terminal, the second call condition may include: the communication status of the mobile terminal meets a communication condition. If the performance information includes the remaining battery level of the mobile terminal, the second call condition may include: the remaining battery level of the mobile terminal is greater than a battery level threshold.

Operation 1046a: Send an assistance call request to the mobile terminal based on the wireless connection.

If determining that the mobile terminal meets the second call condition, the in-vehicle communication component may determine that the mobile terminal can normally send the emergency call request, and may further send the assistance call request to the mobile terminal based on the wireless connection.

It may be understood that the foregoing operation 1045a may also be deleted according to a situation, that is, after the in-vehicle communication component establishes a wireless connection to the mobile terminal, operation 1046a may be directly performed.

Operation 1042b: Broadcast an assistance call request within a target frequency band.

If determining that the in-vehicle communication component does not meet the first call condition, in addition to sending the assistance call request in the manner shown in operation 1042a to operation 1046a, the in-vehicle communication component may directly broadcast the assistance call request within the target frequency band. The target frequency band may be a rescue frequency band.

Figure 6:
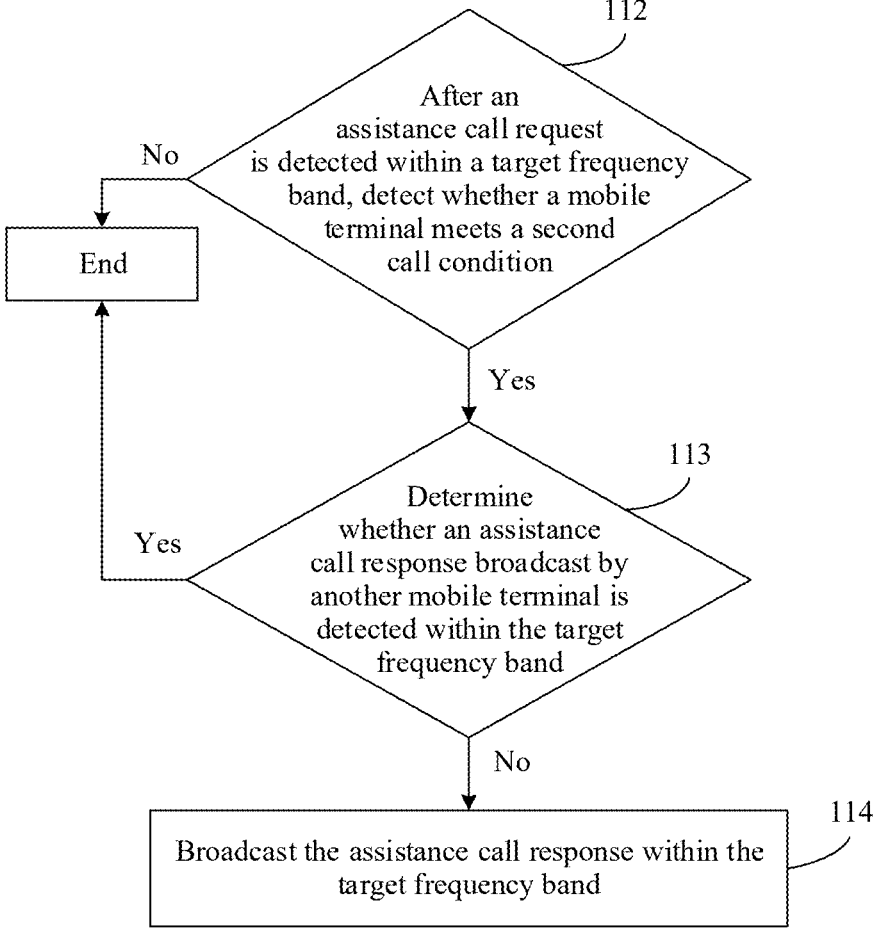
FIG. 6 is a flowchart of another emergency call method according to an embodiment of this application.

In an embodiment, refer to FIG. 6. After operation 1042b, the mobile terminal may further perform the following operation.

Operation 112: After the assistance call request is detected within the target frequency band, detect whether the mobile terminal meets the second call condition.

The mobile terminal may monitor a signal within the target frequency band. If detecting, within the target frequency band, the assistance call request broadcast by the in-vehicle communication component, the mobile terminal may first detect whether the mobile terminal meets the second call condition. If the mobile terminal determines that the mobile terminal meets the second call condition, operation 113 may continue to be performed. If the mobile terminal determines that the mobile terminal does not meet the second call condition, the operation may be ended, that is, the mobile terminal does not need to respond to the assistance call request.

Operation 113: Determine whether an assistance call response broadcast by another mobile terminal is detected within the target frequency band.

If the mobile terminal detects, within the target frequency band, the assistance call response broadcast by the another mobile terminal, it may be determined that there is another surrounding mobile terminal that can assist in sending the emergency call request. Therefore, the operation may be ended, that is, there is no need to repeatedly respond to the assistance call request. If the mobile terminal detects no assistance call response broadcast by the another mobile terminal within the target frequency band, operation 114 may be performed.

Operation 114: Broadcast the assistance call response within the target frequency band.

If the mobile terminal detects, within the target frequency band, no assistance call response broadcast by the another mobile terminal, the assistance call response may be broadcast within the target frequency band. After detecting the assistance call response within the target frequency band, the in-vehicle communication component may determine that the mobile terminal can assist in sending the emergency call request.

In an embodiment, after detecting the assistance call response within the target frequency band, the in-vehicle communication component may further establish, by using the method shown in operation 1043$a$ and operation 1044$a$, a wireless connection to the mobile terminal that broadcasts the assistance call response. After that, the mobile terminal and the in-vehicle communication component may exchange rescue information based on the wireless connection. Because a data volume of the rescue information is large, the rescue information is exchanged through the wireless connection, so that the target frequency band can be avoided from being occupied for a long time due to exchange of rescue information.

It may be understood that operation 113 may be deleted according to a situation. In other words, after detecting the assistance call request and determining that the mobile terminal meets the second call condition, the mobile terminal may broadcast the assistance call response within the target frequency band, without considering whether another mobile terminal has responded to the assistance call request. Correspondingly, a plurality of mobile terminals may assist in sending the emergency call request. Alternatively, operation 113 may be performed before operation 112. That is, when determining that another mobile terminal has not responded to the assistance call request, the mobile terminal may detect whether the mobile terminal meets the second call condition.

In an embodiment, after determining that the vehicle has the emergency rescue requirement, the in-vehicle communication component may first exchange performance information with the mobile terminal. Then, the in-vehicle communication component and the mobile terminal may determine, based on the received performance information, whether to send the emergency call request. Correspondingly, refer to FIG. 6. After operation 103, the method provided in an embodiment of the application may further include the following operations.

Operation 115: The in-vehicle communication component sends performance information of the in-vehicle communication component to the mobile terminal through wireless communication.

In an embodiment, the mobile terminal may establish a wireless connection to the in-vehicle communication component before operation 103. For example, the mobile terminal may actively establish a wireless connection to the in-vehicle communication component. Correspondingly, if determining that the vehicle has the emergency rescue requirement, the in-vehicle communication component may first send the performance information of the in-vehicle communication component to the mobile terminal based on the wireless connection.

It may be understood that operation 115 may be performed before operation 104, or may be performed simultaneously with operation 104. This is not limited in an embodiment of the application.

Operation 116: The mobile terminal sends performance information of the mobile terminal to the in-vehicle communication component through wireless communication based on the assistance call request.

After receiving the assistance call request sent by the in-vehicle communication component and/or the cockpit domain controller, the mobile terminal may send the performance information of the mobile terminal to the in-vehicle communication component in response to the assistance call request.

Operation 117: The in-vehicle communication component detects, based on the performance information of the mobile terminal, whether the mobile terminal meets the second call condition.

If the in-vehicle communication component determines that the mobile terminal does not meet the second call condition, the foregoing operation 105 may be performed, that is, the emergency call request is directly sent to the rescue platform. If determining that the mobile terminal meets the second call condition, the in-vehicle communication component may determine that the mobile terminal can send the emergency call request, and then operation 109 may be performed.

It may be understood that if determining that the mobile terminal meets the second call condition, and the in-vehicle communication component also meets the first call condition, the in-vehicle communication component may perform both operation 105 and operation 109. In other words, both the in-vehicle communication component and the mobile terminal may send the emergency call request. Alternatively, the in-vehicle communication component may perform operation 105, and may not perform operation 109. In other words, when both the in-vehicle communication component and the mobile terminal meet a condition for sending the emergency call request, only the in-vehicle communication component may send the emergency call request. Alternatively, the in-vehicle communication component may compare communication quality of the in-vehicle communication component with that of the mobile terminal. If the in-vehicle communication component determines that the communication quality of the in-vehicle communication component is better than that of the mobile terminal, operation 105 may be performed, and operation 109 is not performed. If the in-vehicle communication component determines that the communication quality of the mobile terminal is better, operation 109 may be performed, and operation 105 is not performed. That is, the emergency call request may be sent by a component with better communication quality.

Operation 118: The mobile terminal detects, based on the performance information of the in-vehicle communication component, whether the in-vehicle communication component meets the first call condition.

If the mobile terminal determines that the in-vehicle communication component does not meet the first call condition, the foregoing operation 107 may be performed, that is, the emergency call request is directly sent to the rescue platform. If determining that the in-vehicle communication component meets the first call condition, the mobile terminal may determine that the in-vehicle communication component can send the emergency call request, and then operation 108 may be performed.

It may be understood that if determining that the in-vehicle communication component meets the first call condition and the mobile terminal also meets the second call condition, the mobile terminal may perform both operation 108 and operation 107. In other words, both the in-vehicle communication component and the mobile terminal may send the emergency call request. Alternatively, the mobile terminal may compare communication quality of the mobile terminal with that of the in-vehicle communication component. If the mobile terminal determines that the communication quality of the mobile terminal is better than that of the in-vehicle communication component, operation 107 may be performed, and operation 108 is not performed. If the mobile terminal determines that the communication quality of the in-vehicle communication component is better, operation 108 may be performed, and operation 107 is not performed. That is, the emergency call request may be sent by a component with better communication quality.

It may be further understood that operation 116 and operation 117 may be deleted according to a situation, that is, only the mobile terminal may determine which component sends the emergency call request. Alternatively, operation 115 and operation 118 may be deleted according to a situation, that is, only the in-vehicle communication component may determine which component sends the emergency call request.

In conclusion, an embodiment of the application provides the emergency call method. When determining that the vehicle has the emergency rescue requirement, the in-vehicle communication component may send the assistance call request to the mobile terminal through wireless communication, and the mobile terminal may further send the emergency call request to the rescue platform based on the assistance call request. Therefore, even if the mobile communication function of the in-vehicle communication component is damaged or a hard line between the in-vehicle communication component and another component is disconnected, the in-vehicle communication component can indicate the mobile terminal to assist in sending the emergency call request. This effectively improves reliability of the emergency call system.

In addition, because a connection between the mobile terminal and the in-vehicle communication component is the wireless connection, an emergency call system fault caused by a hard wire disconnection due to a vehicle collision can be avoided. In other words, the method provided in an embodiment of the application can reduce a probability that the emergency call request cannot be triggered because an internal component of the vehicle is damaged due to a vehicle collision, and reliability is high.

It may be clearly understood by one of ordinary skilled in the art that, for a purpose of convenient and brief description, for an implementation process of the emergency call method described above, refer to the related description in the foregoing system embodiment. Details are not described herein again.

An embodiment of this application further provides an in-vehicle communication component. The in-vehicle communication component may be applied to the emergency call system provided in the foregoing embodiment. Refer to FIG. 1 and FIG. 2. The system may further include the mobile terminal 02 and the fault detection component 03.

The in-vehicle communication component 01 includes a programmable logic circuit and/or program instructions. The in-vehicle communication component 01 may be configured to implement the method performed by the in-vehicle communication component in the foregoing method embodiment.

Figure 7:
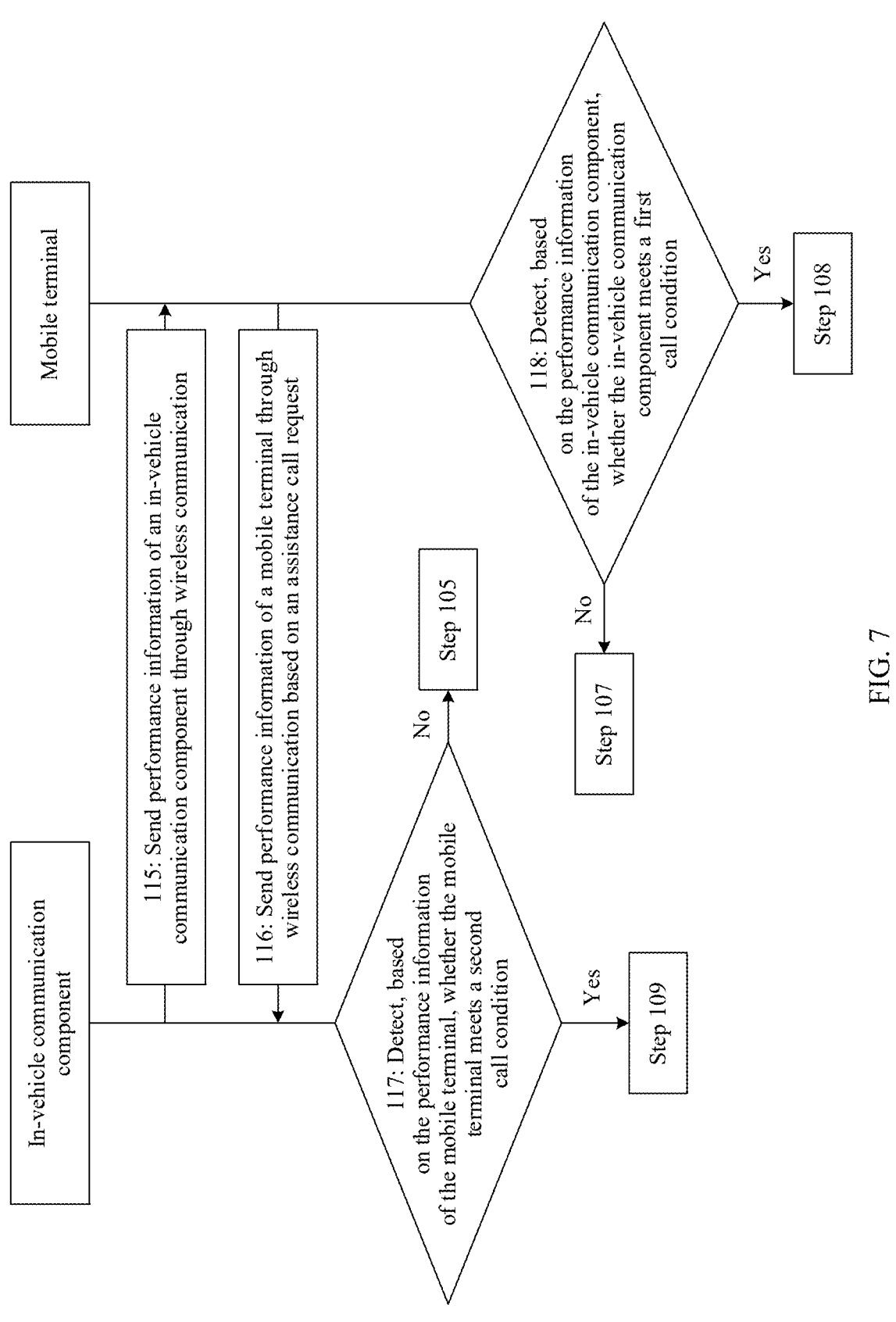
FIG. 7 is a flowchart of still another emergency call method according to an embodiment of this application.

For example, the in-vehicle communication component 01 may be configured to implement the method shown in operation 101, operation 103 to operation 105, operation 109, and operation 111 in the embodiment shown in FIG. 4A and FIG. 4B. In addition, the in-vehicle communication component 01 may be further configured to implement the method in the embodiment shown in FIG. 5. In addition, the in-vehicle communication component 01 may be further configured to implement the method shown in operation 115 and operation 117 in the embodiment shown in FIG. 7.

In an embodiment, the in-vehicle communication component 01 may be a TBOX. At least one SIM card is installed in the in-vehicle communication component 01, and the in-vehicle communication component 01 may further include a baseband chip connected to the SIM card, and a data exchange module configured to exchange data with another component.

Figure 8:
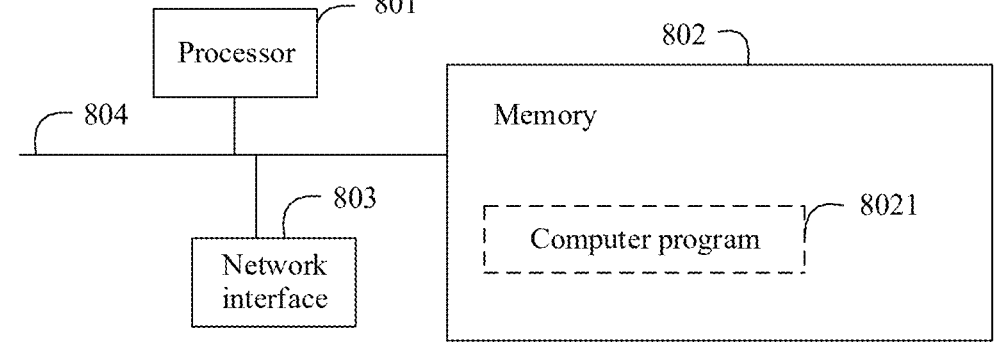
FIG. 8 is a schematic diagram of a structure of a mobile terminal according to an embodiment of this application.

An embodiment of this application further provides a mobile terminal. The mobile terminal may be applied to the emergency call system provided in the foregoing embodiment. Refer to FIG. 1 and FIG. 2. The system further includes the in-vehicle communication component 01 and the fault detection component 03. FIG. 8 is a schematic diagram of a structure of a mobile terminal according to an embodiment of this application. Refer to FIG. 8. The mobile terminal may include a processor 801, a memory 802, a network interface 803, and a bus 804. The bus 804 is configured to connect the processor 801, the memory 802, and the network interface 803. A communication connection to another component may be implemented through the network interface 803 (which may be wired or wireless). The memory 802 stores a computer program 8021. The computer program 8021 is used to implement various application functions.

It should be understood that in an embodiment of the application, the processor 801 may be a CPU, or the processor 801 may be another general-purpose processor, a digital signal processor (DSP), an application-specific integrated circuit (ASIC), a field programmable gate array (FPGA), a GPU or another programmable logic device, a discrete gate, a transistor logic device, a discrete hardware component, or the like. The general-purpose processor may be a microprocessor, any conventional processor, or the like.

The memory 802 may be a volatile memory or a non-volatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 804 may further include a power bus, a control bus, a status signal bus, and the like. However, for clear description, various types of buses in the figure are denoted as the bus 804.

The processor 801 is configured to execute the computer program stored in the memory 802, and the processor 801 implements, by executing the computer program 8021, the method that is applied to the mobile terminal and that is shown in the foregoing method embodiment. For example, the processor 801 may execute the computer program 8021 to implement the method shown in operation 107, operation 108, and operation 110 in the embodiment shown in FIG. 4A and FIG. 4B. In addition, the method in the embodiment shown in FIG. 6 may be further implemented. In addition, the method shown in operation 116 and operation 118 in the embodiment shown in FIG. 7 may be further implemented.

It should be understood that both the in-vehicle communication component and the mobile terminal that are provided in embodiments of this application may be implemented by using an application-specific integrated circuit (ASIC), or a programmable logic device (PLD). The PLD may be a complex programmable logic device (CPLD), a field-programmable gate array (FPGA), a generic array logic (GAL), or any combination thereof.

Certainly, the emergency call method provided in the foregoing method embodiment may also be implemented by using software. When the emergency call method provided in the foregoing method embodiment is implemented by using software, both the in-vehicle communication component and the mobile terminal may include software modules configured to implement the foregoing method.

An embodiment of this application further provides a computer-readable storage medium. The computer-readable storage medium stores instructions, and the instructions are executed by a processor to implement the method applied to the in-vehicle communication component in the foregoing method embodiment, or implement the method applied to the mobile terminal in the foregoing method embodiment.

An embodiment of this application further provides a computer program product including instructions. When the computer program product runs on a computer, the computer is enabled to perform the method applied to the in-vehicle communication component in the foregoing method embodiment, or perform the method applied to the mobile terminal in the foregoing method embodiment.

Figure 9:
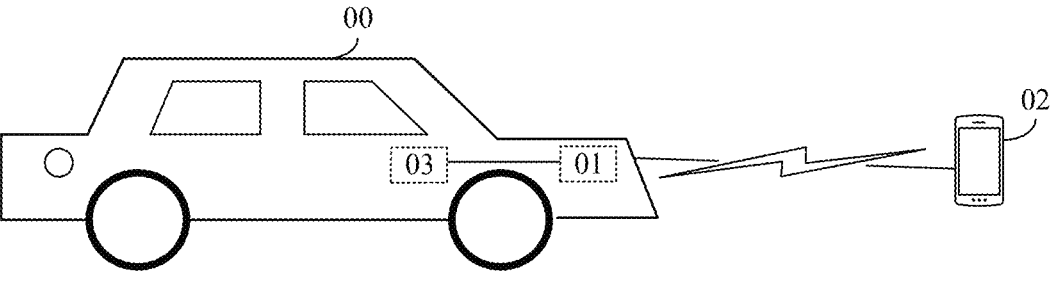
FIG. 9 is a schematic diagram of a structure of a vehicle according to an embodiment of this application.

An embodiment of this application further provides a vehicle. As shown in FIG. 9, the vehicle may include a body 00, and the emergency call system provided in the foregoing embodiment. For example, the vehicle may include the system shown in FIG. 1 or FIG. 2.

Both the in-vehicle communication component 01 and the fault detection component 03 in the emergency call system are fastened to the body 00, and the mobile terminal 02 in the emergency call system can move relative to the body 00. For example, the mobile terminal 02 may be a mobile phone, a phone watch, a notebook computer, a tablet computer, a wearable device, or the like of a user in the vehicle.

In an embodiment, the vehicle may be an intelligent vehicle or a connected vehicle, and the vehicle may be a new energy vehicle (for example, an electric vehicle) or a fuel vehicle.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

In this application, terms such as "first" and "second" are used to distinguish same items or similar items that have basically same effects and functions. It should be understood that there is no logical or time sequence dependency between "first", "second", and "n$^{th}$". A quantity and an execution sequence are not limited.

In addition, in this application, a term "at least one" means one or more, and a term "a plurality of" means two or more.

The foregoing descriptions are only optional implementations of this application, but a protection scope of this application is not limited thereto. Any equivalent modification or replacement readily figured out by one of ordinary skilled in the art within a technical scope disclosed in this application should fall within the protection scope of this application. Therefore, the protection scope of this application shall be subject to a protection scope of the claims.

What is claimed is:

1. An emergency call system of a vehicle, comprising:
   an in-vehicle communication component configured to: in response to determining, based on detection information, that the vehicle has an emergency rescue requirement, send performance information of the in-vehicle communication component and an assistance call request through wireless communication,
   a fault detection component connected to the in-vehicle communication component, wherein
   the fault detection component is configured to send obtained the detection information to the in-vehicle communication component, and the detection information comprises at least one of fault information of the vehicle or a rescue request, and
   a mobile terminal configured to:
   determine a communication quality of the in-vehicle communication component based on the performance information of the in-vehicle communication component including comparing a communication quality of the mobile terminal and the communication quality of the in-vehicle communication component; and
   determine whether to send an emergency call request to a rescue platform based on the assistance call request, the communication quality of the in-vehicle communication component, and the performance information of the in-vehicle communication component received from the in-vehicle communication component.

2. The system according to claim 1, wherein the in-vehicle communication component is configured to:
   in response to determining, based on the detection information, that the vehicle has the emergency rescue requirement, and that the in-vehicle communication component does not meet a first call condition, send the assistance call request to the mobile terminal through wireless communication.

3. The system according to claim 1, wherein the in-vehicle communication component is further configured to:

in response to determining, based on the detection information, that the vehicle has the emergency rescue requirement, send performance information of the in-vehicle communication component to the mobile terminal through wireless communication; and the mobile terminal is configured to:

in response to determining, based on the performance information of the in-vehicle communication component, that the in-vehicle communication component does not meet a first call condition, send the emergency call request to the rescue platform based on the assistance call request.

4. The system according to claim 2, wherein the first call condition comprises at least one of:

a communication status of the in-vehicle communication component meets a communication condition;

the in-vehicle communication component maintains a connection to a multimedia interaction component of the vehicle;

the in-vehicle communication component can obtain the fault information of the vehicle; or the in-vehicle communication component can obtain location information of the vehicle.

5. The system according to claim 1, wherein the in-vehicle communication component is configured to:

send a connection request to the mobile terminal, and after establishing a wireless connection to the mobile terminal, send the assistance call request to the mobile terminal based on the wireless connection; or broadcast the assistance call request within a target frequency band.

6. The system according to claim 1, wherein the mobile terminal is further configured to send performance information of the mobile terminal to the in-vehicle communication component through wireless communication; and the in-vehicle communication component is further configured to:

in response to determining, based on the performance information of the mobile terminal, that the mobile terminal does not meet a second call condition, send the emergency call request to the rescue platform.

7. The system according to claim 6, wherein the second call condition comprises: a communication status of the mobile terminal meets a communication condition, and/or a remaining battery level of the mobile terminal is greater than a battery level threshold.

8. The system according to claim 1, wherein the in-vehicle communication component is further configured to send rescue information to the mobile terminal through wireless communication;

the mobile terminal is further configured to send the rescue information to the in-vehicle communication component through wireless communication; and a target component in the mobile terminal and the in-vehicle communication component is further configured to send the obtained rescue information to the rescue platform, wherein the target component sends the emergency call request to the rescue platform, and the rescue information comprises at least one of: location information of the vehicle, the fault information of the vehicle, an identifier of the rescue platform, or vehicle information of the vehicle.

9. The system according to claim 1, wherein the system further comprises: a cockpit domain controller connected to the fault detection component; and the cockpit domain controller is configured to:

in response to determining, based on the detection information, that the vehicle has the emergency rescue requirement, send the assistance call request to the mobile terminal through wireless communication.

10. The system according to claim 9, wherein the cockpit domain controller is further configured to send the fault information of the vehicle to the mobile terminal through wireless communication.

11. An emergency call method, comprising:

receiving, by an in-vehicle communication component in an emergency call system, detection information sent by a fault detection component of the emergency call system, wherein the detection information comprises at least one of fault information of a vehicle or a rescue request;

determining a communication quality of the in-vehicle communication component based on performance information of the in-vehicle communication component including comparing a communication quality of a mobile terminal and the communication quality of the in-vehicle communication component; and in response to determining, based on the detection information and the communication quality of the in-vehicle communication component, that the vehicle has an emergency rescue requirement, sending performance information of the in-vehicle communication component and an assistance call request to the mobile terminal through wireless communication, wherein the assistance call request indicates the mobile terminal to send an emergency call request to a rescue platform.

12. The method according to claim 11, wherein the sending the assistance call request to the mobile terminal through wireless communication in response to determining, based on the detection information, that the vehicle has the emergency rescue requirement comprises:

in response to determining, based on the detection information, that the vehicle has the emergency rescue requirement, and that the in-vehicle communication component does not meet a first call condition, sending the assistance call request to the mobile terminal through wireless communication.

13. The method according to claim 11, wherein the sending the assistance call request to the mobile terminal through wireless communication comprises:

sending a connection request to the mobile terminal, and after establishing a wireless connection to the mobile terminal, sending the assistance call request to the mobile terminal based on the wireless connection; or broadcasting the assistance call request within a target frequency band.

14. The method according to claim 11, further comprising:

receiving, through wireless communication, performance information of the mobile terminal and sent by the mobile terminal based on the assistance call request; and sending the emergency call request to the rescue platform in response to determining, based on the performance information of the mobile terminal, that the mobile terminal does not meet a second call condition.

15. An emergency call method, comprising:

receiving, by a mobile terminal in an emergency call system through wireless communication, performance information of an in-vehicle communication component and an assistance call request sent by the in-vehicle communication component of the emergency call system, wherein the assistance call request is sent by the in-vehicle communication component after the in-vehicle communication component determines, based on detection information obtained by a fault detection component of the emergency call system, that a vehicle has an emergency rescue requirement, and the detection information comprises at least one of fault information of the vehicle or a rescue request;

determining a communication quality of the in-vehicle communication component based on the performance information of the in-vehicle communication component including comparing a communication quality of the mobile terminal and the communication quality of the in-vehicle communication component; and determining, by the mobile terminal, whether to send an emergency call request to a rescue platform based on the assistance call request, the communication quality of the in-vehicle communication component, and the performance information of the in-vehicle communication component.

16. The method according to claim 15, wherein the receiving the assistance call request sent by the in-vehicle communication component comprises:

receiving a connection request sent by the in-vehicle communication component, and after establishing a wireless connection to the in-vehicle communication component, receiving the assistance call request sent by the in-vehicle communication component based on the wireless connection; or receiving the assistance call request broadcast by the in-vehicle communication component within a target frequency band.

17. The method according to claim 15, further comprising:

receiving, through wireless communication, performance information of the in-vehicle communication component and sent by the in-vehicle communication component; and the sending an emergency call request to a rescue platform based on the assistance call request comprises:

sending the emergency call request to the rescue platform based on the assistance call request in response to determining, based on the performance information of the in-vehicle communication component, that the in-vehicle communication component does not meet a first call condition.

18. The method according to claim 15, wherein the system further comprises a cockpit domain controller that establishes a wireless connection to the mobile terminal; and the method further comprises:

receiving the assistance call request sent by the cockpit domain controller through wireless communication.

* * * * *